US007412263B2

(12) United States Patent
Seier

(10) Patent No.: US 7,412,263 B2
(45) Date of Patent: Aug. 12, 2008

(54) ADVISORY ALERT OF LOW SIGNAL STRENGTH FOR CELL PHONE USER

(75) Inventor: Albert C. Seier, Walnutport, PA (US)

(73) Assignee: Agere Systems, Inc., Allentown, PA (US)

( * ) Notice: Subject to any disclaimer, the term of this patent is extended or adjusted under 35 U.S.C. 154(b) by 216 days.

(21) Appl. No.: 10/931,902

(22) Filed: Sep. 1, 2004

(65) Prior Publication Data

US 2006/0068731 A1 Mar. 30, 2006

(51) Int. Cl.
*H04B 1/38* (2006.01)
*H04M 1/00* (2006.01)

(52) U.S. Cl. .......... 455/567; 455/67.13; 455/404.2; 455/414.2; 455/421; 455/456.1; 455/455; 455/510; 455/553.1; 455/574

(58) Field of Classification Search .......... 455/567, 455/67.13, 404.2, 414.2, 510, 553, 574, 421, 455/455, 456.1–457, 67.7; 340/539.15
See application file for complete search history.

(56) References Cited

U.S. PATENT DOCUMENTS

| | | | | |
|---|---|---|---|---|
| 5,193,216 A | * | 3/1993 | Davis | 455/67.7 |
| 5,203,011 A | * | 4/1993 | Bane et al. | 455/510 |
| 5,471,671 A | * | 11/1995 | Wang et al. | 455/226.2 |
| 5,530,926 A | * | 6/1996 | Rozanski | 455/277.2 |
| 5,812,056 A | * | 9/1998 | Law | 340/539.15 |
| 6,018,655 A | * | 1/2000 | Bartle et al. | 455/421 |
| 6,119,012 A | * | 9/2000 | Amirijoo | 455/456.1 |
| 6,597,929 B1 | * | 7/2003 | Han et al. | 455/574 |
| 6,691,029 B2 | | 2/2004 | Hughes et al. | |
| 6,882,860 B1 | * | 4/2005 | Kim | 455/553.1 |
| 2004/0132410 A1 | * | 7/2004 | Hundal et al. | 455/67.13 |
| 2004/0203895 A1 | * | 10/2004 | Balasuriya | 455/456.1 |

* cited by examiner

*Primary Examiner*—Stephen M D'Agosta
(74) *Attorney, Agent, or Firm*—Duane Morris, LLP

(57) ABSTRACT

The invention provides an advisory alert indicating conditions are such that an ongoing telephone call involving a cellular telephone may be dropped due to insufficient signal strength. A decrease in signal strength over time that exceeds a specified percentage decrease provides the primary basis for triggering the advisory alert. This advisory alert warns one or more participants of the call of the possibility of the call ending due to low signal strength. The advisory alert provides for conclusion of the call before the call is lost, and/or lowers the frustration level associated with a call lost for an unknown reason.

In operation, signal strength is assessed during a series of time intervals. Signal strength of consecutive time intervals is compared. If the percentage drop in signal strength exceeds a specified percentage, an advisory alert is effectuated. The criteria that trigger an advisory alert may be non-programmable, or is modifiable in programmable embodiments.

8 Claims, 4 Drawing Sheets

US 7,412,263 B2

ADVISORY ALERT OF LOW SIGNAL STRENGTH FOR CELL PHONE USER

FIELD OF THE INVENTION

This invention relates in general to cellular telephone apparatuses, methods and systems. This invention relates more particularly to providing an advisory alert during a telephone call involving a cellular telephone that alerts one or more users of a high possibility of a loss of that call due to a decreasing signal strength condition.

BACKGROUND OF THE INVENTION

The use of cellular telephones within cellular telephone networks has substantially advanced the convenience and mobility of communication between users of telephones. However, as with many advances in technology, limitations often present themselves, which in turn create new frustrations and new opportunities to deal with those frustrations. One not-uncommon frustration among telephone users is when, during an ongoing telephone call that involves a cellular telephone, the signal strength to or from that cellular telephone has dropped sufficiently to cause an abrupt, unexpected loss of call (also known as a "dropped call").

Although improvements in cellular telephone networks and cellular telephones themselves have helped limit such dropped call occurrences within given regions and systems, the abrupt, unexpected loss of call remains a problem for many cellular telephone users. This also presents a problem for the landline parties with whom they communicate. Often, one party may continue speaking, not realizing the call already has terminated. That party, as well as one or more parties on the same call, frequently feel frustration due to an unexpected interruption of the call. Efforts often are made to call back the other party or parties to inform them of that the call was unintentionally dropped. Upon reconnecting at a later time, time and effort are required to establish the last thing the other party heard in order to efficiently continue the conversation.

Certain approaches are known in the art to help warn such telephone users of a possible loss of call due to insufficient cellular telephone signal strength. For example, U.S. Pat. No. 6,018,655, issued Jan. 25, 2000 to Bartle and Erickson, discloses methods of analyzing various conditions of cellular telephone operation, and then, when a specific predefined threshold is met for a particular condition, notifying the user that a communication disconnection is imminent. Among the conditions disclosed are count/rate communications such as frame validity, frame quality, symbol quality, and chip quality. Transmitter output level and received signal strength indication (RSSI) are other conditions measured and analyzed.

According to the disclosure of U.S. Pat. No. 6,018,655, if an error rate has been detected by the analysis of conditions (i.e., data for a condition has exceeded its threshold), a control system of the digital telephone system attempts to improve the quality of the audio signals based on the analysis of conditions. Also, under such circumstance a warning process ensues. For example, if the RSSI falls below a fixed threshold level, then a warning signal is generated to advise the cellular telephone user. This warning may be delayed, in certain embodiments, until two consecutive threshold violations have occurred, in order to reduce the likelihood of an erroneous warning.

U.S. Pat. No. 6,330,438, issued Dec. 11, 2001 to McClelland and Madison, recognizes the problem of communications signal strength that is too low to continue a call. When there is no other cell to hand off to, in order to sustain adequate signal strength, the user of a mobile cell phone unit is alerted to the low signal situation. This is stated to provide the user with time to take precautionary steps, such as the user moving or re-orienting the mobile cell phone unit in order to improve signal reception. In order to determine when to provide an audible warning prior to losing such an in-progress call, the received signal level is compared to a predetermined threshold level. If the received signal level falls below the predetermined threshold level, and there is not another cell to which to hand off the call, then an audible signal is generated to warn the cell phone user. U.S. Pat. Nos. 6,018,655, 6,330,438, and all other patents, all patent applications, all patent publications, and all other publications cited herein are incorporated by reference to the same extent as if each individual publication or patent application was specifically and individually set forth in its entirety, and are particularly incorporated by reference for the teachings disclosed herein.

The above approaches suffer from the comparison to a predetermined, fixed threshold, the crossing of which is the criteria for the signal to user of a possibly imminent dropped call. Also, these approaches do not provide for warning of parties other than the user whose cell phone has the disclosed features. Even when the user of the relevant cell phone receives the warning signal, he or she may not have enough time to complete a verbal statement to the call's other party or parties to inform them of the likelihood of a dropped call.

The present invention more fully addresses the problems associated with low-signal-strength-based dropped calls and overcomes the shortcomings of the above approaches. The methods, systems and apparatuses of the present invention provide superior advisory alerts to the parties involved in a telephone call that involves at least one cellular telephone, including the user of that cellular telephone.

SUMMARY OF THE INVENTION

The present invention provides methods, systems, and apparatuses that provide to users of cell telephones an advisory alert indicating conditions are such that the call may be dropped due to insufficient signal strength. A lowering in signal strength over time that exceeds a specified percentage drop in signal over time is the primary basis for providing the advisory alert. For example, signal strength is assessed during a series of time intervals. The signal strength of consecutive time intervals is compared. If the percentage drop in signal exceeds a specified percentage, an advisory alert is effectuated.

Various modifications to the comparison algorithm may be used to customize the feature for particular users' preferences and geographic/cellular network characteristics. For instance, and not to be limiting, the percentage that triggers an alert may be modified, the total periods for comparison to obtain percentage signal drop may be modified, the significance of an upward trend in signal strength during a general downtrend may be altered, and relative strength of the initial signal during a comparison analysis may effect the significance of a given percentage drop per unit time from that initial signal strength.

It is noted that in basic embodiments the parameters to provide an advisory alert may be preset and not modifiable. However, even in this embodiment the criterion and the decision tree or algorithm to provide an advisory alert differs from the above-disclosed prior art approaches. Namely, percentage change in signal strength, rather than crossing a predetermined threshold, comprises the criterion upon which data is analyzed to determine whether or not to provide an advisory alert.

Also among the many objects of the present invention may be noted providing the ability to select one or more of the output features. For instance, a user of a cell phone comprising the features of the present invention may designate that all parties on a call are alerted of a possibly imminent dropped call due to low signal strength. This offers an advantage over the time delay, and possible incomplete communication, when the user of the cell phone hears the advisory alert, perhaps finishes the phrase he/she is speaking (or waits for the other person to do the same), and then starts to indicate the call may soon be lost. When the present invention is set to alert all parties on the call, parties distant from the cell comprising the present invention have a better likelihood of receiving and understanding the advisory alert compared to the user passing this on after having received the alert only at that user's phone.

As to another output feature option, the source and type of advisory alert may be user-selected. For instance, not to be limiting, a user may select from an audible sound emanating from the speaker providing incoming voice (i.e., the earpiece speaker), an audible sound emanating from a speaker other than this speaker (such as the speaker used to warn of low battery strength or a dedicated ringer), a vibration signal (as produced by a vibrator), a light signal (i.e., from a Light Emitting Diode, "LED"), and so forth. For example, not to be limiting, using a ringer would allow all parties to hear the alert since the sound waves would propagate through the mouthpiece simultaneously with the words being spoken by the cell user. Also, not to be limiting, a user may select the volume of the advisory alert, and whether to vary the intensity of the advisory alert to key parameters of the measured change in signal strength that resulted in (i.e., that triggered) the advisory alert.

Other aspects, advantages and objects of the present invention are provided in the following description, which is to be considered with the appended drawings.

DETAILED DESCRIPTION OF THE INVENTION

Described below are methods, systems and apparatuses pertaining to the provision of an advisory alert to alert one or more parties of a telephone call of the possibility of an imminent dropped call. This is based on percentage drop of signal tracked over time. It is envisioned that two or more parties are participating in the telephone call, and at least one of the parties has a telephone that comprises one or more embodiments of the present invention. The following descriptions and examples are meant to be exemplary and not limiting.

Figure 1:
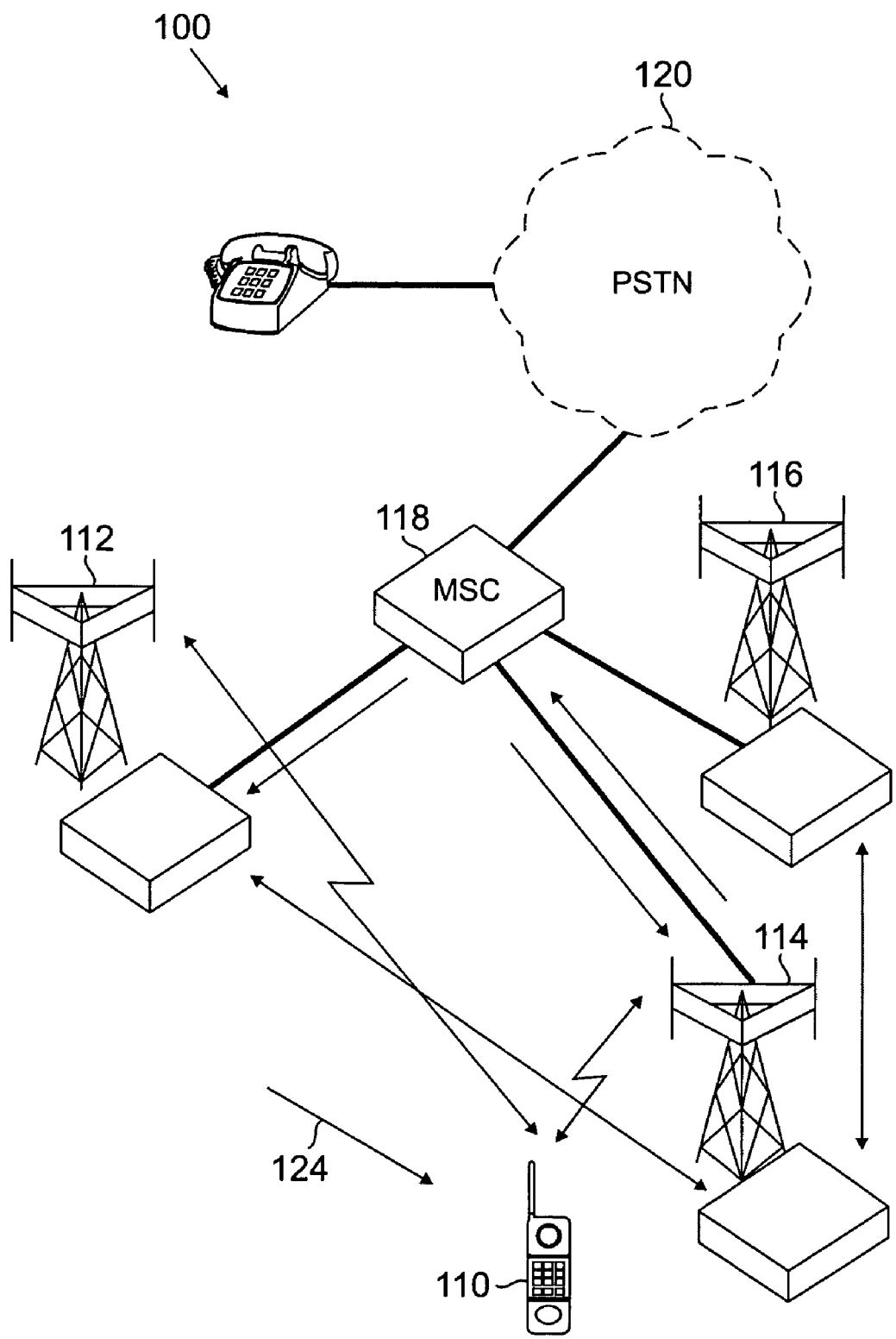
FIG. 1 provides a simplified schematic diagram of the components of a cellular telephone network.

FIG. 1 provides a simplified schematic diagram of the components of a cellular telephone network 100 in which a cellular telephone unit 110 may be modified to comprise the methods, systems, and/or apparatuses of the present invention. Although represented in FIG. 1 as a hand-held mobile telephone, cellular telephone unit 110 ("cell phone" or "mobile phone") is taken to include a hand-held mobile telephone, a cellular telephone system installed into a moving vehicle such as an automobile, and any other unit or station designed and operated to communicate sound or data communication via a system of cell sites.

FIG. 1 depicts three cell sites 112, 114, and 116 (alternately known as base stations). As is generally known in the art, a cell site transmits voice and data signals in a limited geographic area (a cell or coverage area) to a plurality of cellular telephone units within that area, and transmits voice and/or data signals involving calls from that plurality of cellular telephone units beyond that area to other parties on either other cell phones or landlines. Typically, forward and reverse voice channels transmit voice signal and other functions, and forward and reverse setup (control) channels perform other functions, such as accessing the network. FIG. 1 depicts a typical means of such transmission, via a mobile switching center 118 ("MSC"). MSC 118 receives signals and data from cell sites 112, 114, and 116, processes these signals and data, and transmits signals and data as appropriate from and to the telephone calls in which users have their cell phones in cell sites 112, 114, and 116, and from and to the respective other parties of those calls. MSC 118 makes most such transmissions to the other parties via wire connection with a Public Switched Telephone Network ("PSTN") 120. PSTN 120 maintains a plurality of ongoing telephone calls between wired telephones such as landline telephone 122, and also between such wired telephones and mobile telephones such as cellular telephone unit 110 via MSC 118.

MSC 118 also receives signals indicating the strength of signals of cell phone 110 located in the cells of cell sites 112, 114, and 116 (and others not shown). As depicted in FIG. 1, cell site 112 is the current cell site for cellular telephone unit 110. Arrow 124 depicts the historical movement of cellular telephone unit 110. When a signal is weak via the present cell site 112 but is stronger via another cell site, i.e., cell site 114, as when a user is traveling toward or within the latter cell's coverage area, MSC 118 performs a "handoff" of that user's cell phone to the latter cell site. This handoff is seamless to the user. However, if due to unfavorable local climatological conditions, impaired or inoperative nearby cells, or other reasons, the signal strength between cellular telephone unit 110 and currently used cell site 112 is decreasing, and suitable nearby cell sites (i.e., 114 and 116) do not detect superior signal strength from that cell phone, MSC 118 will not handoff the call. With further decrease in signal strength, the call will be lost, or dropped. It is under such conditions that the methods, systems, and apparatuses of the present invention provide an advisory alert to indicate that conditions are such that the call may be dropped due to insufficient signal strength.

Figure 2A:
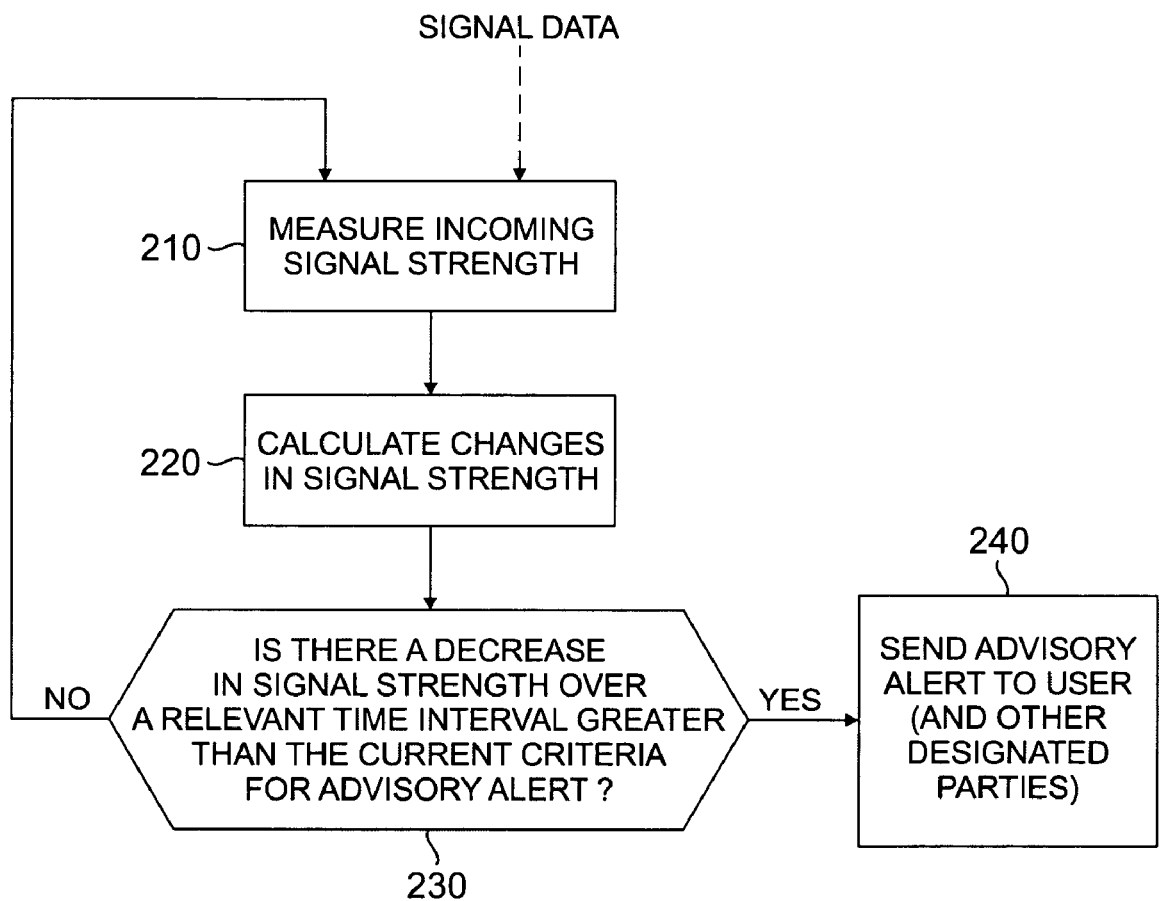
FIG. 2A depicts a logic flow diagram of the steps of one embodiment of a method of the present invention, directed to measuring incoming signal strength and providing an advisory alert based on changes in such incoming signal strength.

FIG. 2A is a diagram depicting the logic flow 200 of one embodiment of the present invention. Generally, the steps of the present invention are implemented with a programmable logic circuit, a dedicated logic circuit, or an analog circuit. For a programmable logic circuit, the system of the present invention is installed in a particular cell phone, such as by loading of operating code to a semiconductor chip to enable the program in memory of the cell phone (not shown). By semiconductor chip is meant a typical programmable or non-programmable logic circuit that may includes a processor (analog or digital circuits) and memory. As used herein, means for measuring signal strength, means for calculating a percentage change in signal strength between two or more of said time intervals; and means for comparing a percentage change to a percentage change criterion are comprised of logic programs within the respective programmable logic circuit, dedicated logic circuit, or analog circuit that is/are selected and employed in the relevant device of the present invention. That is, embodiments of the present invention may include a measurement circuit, a calculation circuit, and a comparison circuit, appropriately interconnected to transfer data, and appropriately linked to an advisory alert generator. Likewise, embodiments of the present invention may implement measurement, calculation, comparison, and other functions in discrete modules, in one or more microprocessors, or in a series of programmable or non-programmable steps of a single logic circuit associated, as appropriate, with memory. Also, combinations of these configurations are within the scope of the invention, and within the meaning of, respectively, means for measuring signal strength, means for calculating a percentage change in signal strength between two or more of said time intervals; and means for comparing a percentage change to a percentage change criterion. Further, generally, the term "measurement component" is taken to mean any form of measuring signal strength as described herein or later developed, the term "calculation component" is taken to mean any form of calculating changes in signal strength as described herein or later developed, and the term "comparison component" is taken to mean any form of comparing changes in signal strength as described herein or later developed.

Referring to FIG. 2A, data of incoming signal strength is measured in the cell phone per block 210. This generates a specific quantitative signal strength measurement, such as, without being limited, Received Signal Strength Indication ("RSSI"), for each specified time interval. Such quantity for each time interval may be obtained by averaging or by taking a single reading within that time interval. This data may be monitored for measurement of signal strength continuously or at desired intervals, and may be stored as is appropriate (not shown) for subsequent calculation, comparison and other analysis. "Data storage," as used herein, refers to any data storage hardware, component or mechanism known in the art or later developed, and may be used to store any basic or calculated information for the methods, systems and devices described and claimed herein. As an example, data storage may comprise a conventional random access memory module. Not to be limiting, data may be stored in data storage during or between any one of the steps in FIG. 2A.

Block 220 calculates changes in signal strength between time intervals. For instance, signal strength data may be collected and averaged every 0.1 seconds, to provide a single value. Then each of these values may be used to determine changes in signal strength over time. Alternatively, without being limiting, no averaging is done over a time period, and single data points of signal strength are utilized in the next step. Decision block 230 compares changes in signal strength and determines, after at least two different signal strengths are compared, if a comparison of the signal strengths taken a relevant time interval apart indicates a decrease in signal strength over time that meets or exceeds a set percentage decrease over time (the "send-alert" criterion or level). If the answer is YES, then an advisory alert is sent per block 230 to block 240. If the answer is NO, that is, the percentage decrease in signal strength over the relevant time interval does not exceed the send-alert percentage-decrease criterion, then no alert is sent. In such instances the real-time data continues to be processed and compared in accordance with blocks 210, 220, and 230. Block 220 depicts the next step, calculation of the change in signal strength with respect to a sequence of time intervals. The calculation of change may be determined by averaging a consecutive series of time intervals, only comparing immediately adjacent time intervals, or by other suitable comparisons, some of which are described below.

The steps of FIG. 2A describe a general method of the present invention, and is not meant to be limiting. In that method, signal strength is repeatedly measured over a series of time intervals, stored as needed, and compared. It is noted that additional steps or sub steps of logic may be added to a specific program, for instance, a specific calculation or a specific storage step or sub step, without departing from the scope and spirit of the invention.

Thus, based upon results of a method of the present invention, when the criterion or criteria is/are met, a signal is sent to an advisory alert generator (i.e., a speaker on the phone) to provide an advisory alert. Further it is noted that the general criterion "decreased by a designated percentage," which triggers an advisory alert, is taken to include meeting or exceeding a specific value, or, depending on the set-up of the criterion, meeting or falling below a specific value.

Also, it is noted that the comparison may be between or among signal strength data from non-consecutive time intervals. Also, a delay in sending the signal to provide an advisory alert may be part of the algorithm, providing for one or more additional comparisons to confirm the first result that met the advisory alert criterion. These approaches provide for repetitive comparisons in order to reduce the frequency of false positive advisory alerts.

Examples, not meant to be limiting, are provided of the send-alert criterion. One example is a 50 percent drop in signal strength over a designated time interval of three seconds. For example as to measurement, signal strength is collected every 0.1 second (as by averaging or a single detection and measurement), and data from each 0.1 second time increment is compared to data from a time increment three seconds apart. If such a signal strength drop were detected and were to continue at the same or similar rate, a high likelihood exists that the call will soon be dropped. In such example once this 50 percent loss of signal strength over three seconds were detected, an advisory alert is transmitted to the user (and other parties, if so established). Another example of a send-alert criterion is a 20 percent signal strength reduction over a 5-second designated time interval. If such signal drop were detected by comparing any two consecutive 5-second period of a telephone call, the advisory alert would be activated.

A somewhat different example is an 80 percent reduction in signal strength over an indefinite period of time. The timer would reset on any transitional increase in signal strength, thereby resetting the highest signal from which the 80 percent drop is measured. Accordingly, under many scenarios, the likelihood is high that an 80 percent loss from such reset high value would occur over a short time period. This is supportive of the likely loss of the call in such circumstance, justifying the activation of the advisory alert. It is noted that for this latter example, additional logic would need to be added to FIG. 2A, namely, to reset the high signal value to adjust the criterion on an ongoing basis.

In some embodiments, the percentage drop or the algorithm (per the above examples) that triggers an alert may be modified by programming, either by the user or the telephone system (as if excessive false positive advisory alerts are being provided). The total periods for comparison to obtain percentage signal drop similarly may be modified. In addition to the last example immediately above, an upward trend in signal strength during a general downtrend may be given different significance, and this may be programmed into a user-modifiable embodiment. For example, not to be limiting, an upswing in signal strength may be disregarded if it is less than 15 percent over a set number of time intervals. Or if the number of signal upswings exceeds a set amount in a given period, this may indicate high fluctuation but less danger of a dropped call. In such cases the program may be set to recognize such condition and "soften" the advisory-alert activation criterion (i.e., only provide the advisory alert after a more stringent percentage drop of signal).

Also, it is recognized that a particular algorithm or program may be established so that a higher initial signal strength operates to provide an advisory alert at a different percentage drop per unit time than a lower initial signal strength. For instance, not to be limiting, consider a situation in which the range of RSSI over which the incoming signal is fully intelligible to an average user is divided into three zones—high signal strength, medium signal strength, and low signal strength. Then, if the initial RSSI during a comparative sequence falls in the high signal strength zone, a relatively high percentage drop would be required in order to trigger an advisory alert. Similarly, if the initial RSSI during a comparative sequence falls within the medium signal strength zone, a somewhat less steep percentage drop, compared to the high initial signal criterion, would be required in order to trigger an advisory alert. Table 2 provides one example, not to be limiting, of parameters for such signal-zone-based approach.

TABLE 2

| Zone in which initial reading is taken for the comparative sequence | Percentage Drop over 5 seconds to trigger advisory alert |
|---|---|
| High | 60 |
| Medium | 40 |
| Low | 20 |

Figure 2B:
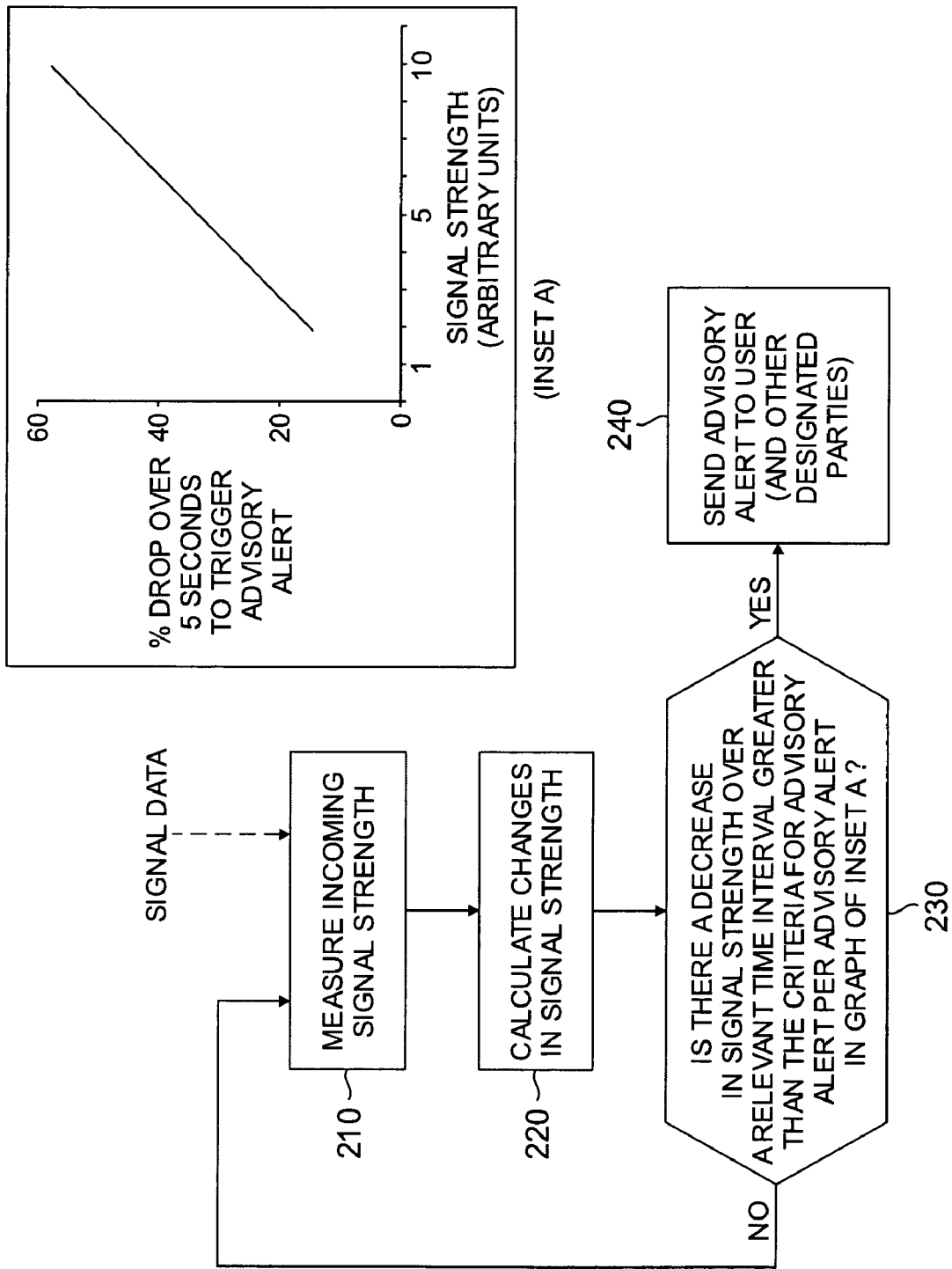
FIG. 2B provides a logic flow diagram and an inset graph providing one embodiment of a continuous function criterion based on initial signal strength.

Any number of such initial signal strength zones may be selected for a particular algorithm or program. One specific algorithm, not to be limiting, is provided in Example 1. Instead of step-wise gradations as shown in the table, a continuous function may be implemented to provide for adjustment of the percentage drop over time for provision of an advisory alert, where the adjustment is based upon starting signal strength. FIG. 2B provides an inset graph showing one embodiment of a continuous function criterion based on initial signal strength. As indicated in the inset graph, a higher percentage drop is required to trigger an advisory alert when the initial signal strength for the relevant measurement period is high. By smoothing the transition points compared to the discrete signal-zone approach such as depicted in Table 2, a continuous function approach (such as exemplified in the inset of FIG. 2B) provides an opportunity for a lower probability of unnecessary (false) alerts and lost calls without an advisory alert having been provided.

As to this and other examples, by "comparative sequence" is meant at least two time intervals that are being compared for the purposes of determining whether changes in signal strength indicate a high possibility of an imminent dropped call. In the above example, the two time intervals are immediately adjacent in time, with no intervening time interval(s). However, for all methods of the present invention, it is appreciated that algorithms may be developed and used in which a comparison is made between non-adjacent intervals. For certain conditions and criteria, this may be preferable in avoiding a high percentage of false advisory alerts.

Figure 3:
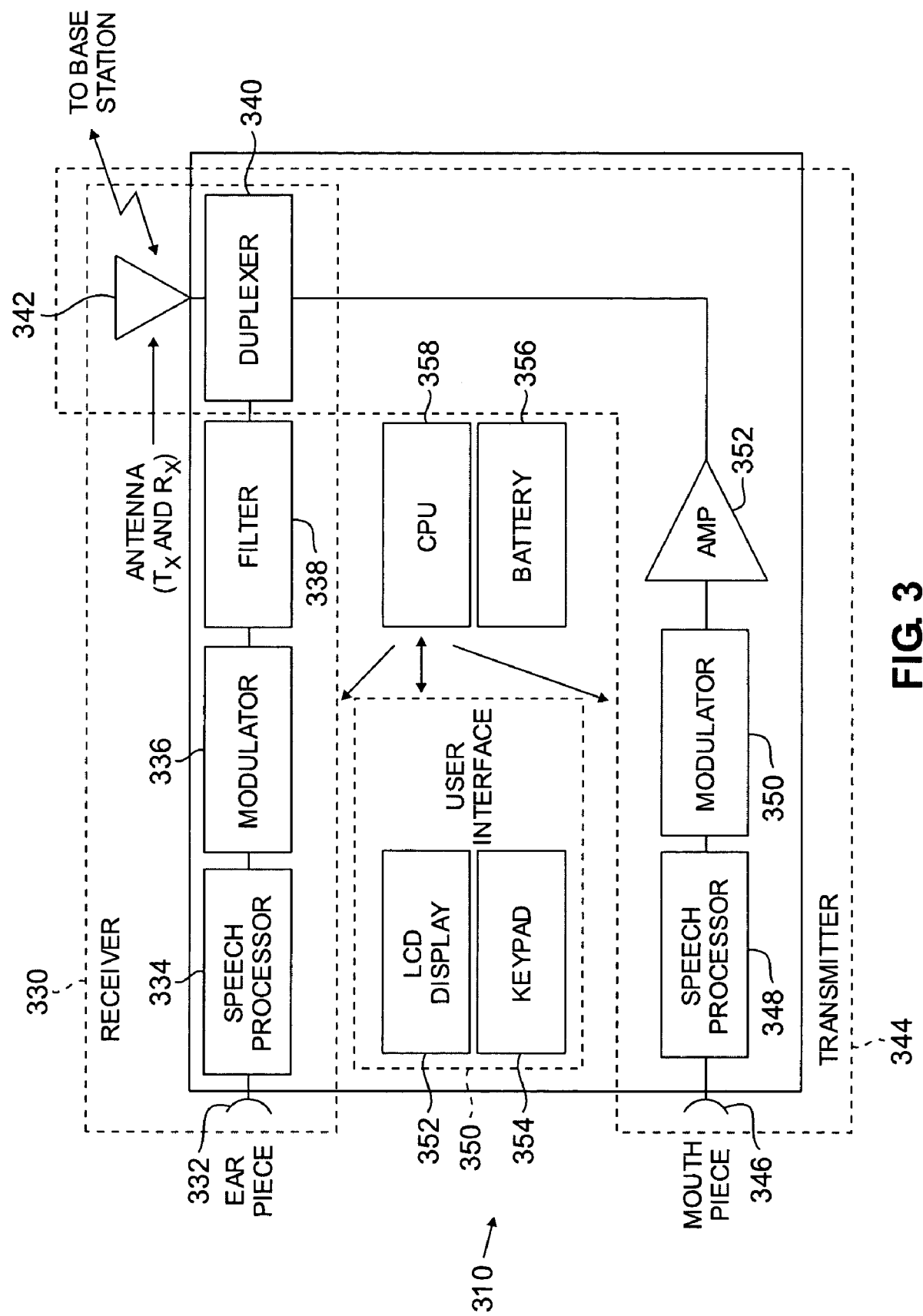
FIG. 3 provides a simplified schematic/block diagram of the functional components that make up a cellular telephone 310 adapted to comprise embodiments of the present invention.

FIG. 3 provides a simplified schematic/block diagram of the functional components that make up a cellular telephone 310 adapted to comprise embodiments of the present invention. Three major functional zones are delineated by dashed lines. One is a receiver 330, comprising an earpiece 332 (i.e., a speaker), an earpiece speech processor 334, an earpiece demodulator 336, a filter 338, and a shared duplexer 340 and shared antenna 342. A second major functional zone is a transmitter 344, comprising a mouthpiece 346 (i.e., a microphone), a mouthpiece speech processor 348, a mouthpiece modulator 350, an amplifier 352, and the shared duplexer 340 and the shared antenna 342. The third major functional zone is a user control interface 350. This comprises an LCD display 352 and a keypad 354 comprising a number of separate keys (not shown). Cellular telephone 310 also comprises a battery 356 to supply power and a central processing unit ("CPU") 358. CPU 358 interfaces with all three major functional zones, 330, 344, and 350. The CPU 358 comprises the logic circuits and algorithms to perform the methods of the present invention, including to generate a command to provide an advisory alert.

One or more of the above disclosed approaches for a desired advisory alert may be selected by pressing by strokes of a finger, etc., specific keys on keypad 354 during a programming of CPU 358 that comprises algorithms needed to operate such approaches. During such programming, visually accessible cues and information are shown on display 352. Upon completion of a programming, the selected criterion or criteria is/are used in CPU 358. For instance, the logic blocks of FIG. 2A may be utilized. In accordance with the selected approach and algorithm, an advisory alert is provided via an advisory alert generator when signal strength exceeds the signal-providing criterion.

Notwithstanding the above discussion of modifiable advisory alerts, in basic embodiments the parameters to provide an advisory alert are preset and are not modifiable. For instance, a non-modifiable method and system of the present invention may be provided in a dedicated logic circuit. However, even in this embodiment the approach to the logic decision to provide an advisory alert differs from the prior art approaches in the patents discussed above. Namely, percentage change in signal strength, rather than crossing a predetermined threshold, comprises the criterion upon which data is analyzed to determine whether or not to provide an advisory alert.

The advisory alert of the present invention may be independent or associated with determination of whether there is a nearby cell site to which to hand off. As to the latter, for example, programming, signaling and analyses are conducted to assess the power between the cellular telephone and nearby cell sites in addition to the present cell site (such as when signal strength is diminishing from the present cell site). This involves communications between the cellular telephone, the MSC, and relevant cell sites. For instance, one approach to this is disclosed in U.S. Pat. No. 6,330,438, which is incorporated by reference particularly for the disclosure of methods of handoff to other cells. Generally, a presently used cell site routinely determines signal strength from a user's cell phone. When that signal strength weakens, the MSC signals to nearby cell sites to have such cell sites obtain signal strength from that cell phone. If a sufficiently strong signal is reported from one of these nearby cell sites, the MSC directs a handoff (usually involving changing the voice radio channel) to such cell site.

When the advisory alert of the present invention is associated with such handoff determination programming, a combination of criteria may be analyzed to reach a decision to provide an advisory alert. These criteria may include trends in changes in signal strength among adjacent cell sites, the existence of a current soft handoff, and other factors.

In other embodiments of the present invention, the strength of the advisory alert is positively related to the percentage decrease in signal that triggered the advisory alert. For example, not to be limiting, a particular cellular phone of the present invention has a criterion of 50% signal drop in 5 seconds for provision of an advisory alert. If programmed so the advisory alert is positively related, an advisory alert triggered by a signal drop of 50% in 5 seconds provides an audible advisory alert comprising three soft tones. By contrast, if a signal drop of 80% in 5 seconds triggered the alert, the audible advisory alert comprises five, more rapid and louder tones.

In other embodiments of the present invention, the strength of the advisory alert is negatively related to the relative strength of the last signal measured that gave rise to the provision of the advisory alert. For example, not to be limiting, the range of signal strength is divided into four zones, from strongest to weakest. If the last signal measured for the comparison that triggered the advisory alert is in the strongest zone, the corresponding advisory alert is less intense than when such a last signal is in the weakest zone. In some embodiments, the strength of the advisory alert is both positively related to the rate of percentage decrease in signal and is negatively related to the relative strength of the last signal measured that gave rise to the provision of the advisory alert.

Further, the above-disclosed approaches are amenable to bundling into specific user-friendly selectable options. For instance, not to be limiting, a particular advisory alert selection provided in a cellular phone may incorporate the multiple zone approach (stepwise or continuous) and also include modifying the strength of the actual advisory alert signal to the user(s) in accordance with the rate of percentage decrease in signal and/or the relative strength of the last signal measured that gave rise to the provision of the advisory alert.

Also provided in embodiments of the present invention is the ability to select one or more output styles and destination combinations for the advisory alert. For example, not to be limiting, output styles are selected from audible, vibrational, visual, and combinations thereof. An audible advisory alert may be a single tone, a series of tones (of the same or differing frequencies), a verbal message, or any other audible signal such as those presently used in cellular telephones. A vibrational advisory alert comprises creating a vibration of the cellular telephone. A visual advisory alert comprises one or more light emissions from an LED or a liquid crystal display ("LCD") or other light-generating source, as may be found in or on the cellular telephone. For instance, not to be limiting, a user may select from an audible sound emanating from the speaker providing incoming voice (i.e., the earpiece speaker), an audible sound emanating from speaker other than this speaker (such as the speaker used to warn of low battery strength), a vibration signal (as produced by a vibrator), a light signal (i.e., from a Light Emitting Diode, "LED"), and so forth. As the term is used herein, including in the claims, the term "advisory alert generator" is taken to mean the hardware, now known and later developed, that generates these sources and types of advisory alert signals. Such advisory alert generator need not, and generally is not, dedicated to this one purpose. Typically, such as when utilizing the earpiece speaker to provide an advisory alert, the advisory alert generator has other functions.

Whether selectable or not, in most embodiments the advisory alert that is generated is distinctive so as to be distinguishable from other sounds, vibrations, etc., that may be generated for other purposes (i.e., the low battery signal). This provides for proper and rapid recognition of the situation.

As to destination combinations, one alternative is to designate that only the user of the cellular phone comprising the features of the present invention receives an advisory alert. Another alternative is that all parties on a call are alerted of a possibly imminent dropped call due to low signal strength. All parties of a call share a unique communication event and have in common an interest in knowing if the call is soon to end. This is important for both two-party and multiparty (i.e., conference) calls. As discussed above, directly alerting all parties offers an advantage over the time delay, and possible incomplete communication, when the user of the cell phone hears the advisory alert, perhaps finishes the phrase he/she is speaking (or waits for the other person to do the same), and then starts to indicate the call may soon be lost. When the present invention is set to alert all parties on the call, parties distant from the cell comprising the present invention have a better likelihood of receiving and understanding the advisory alert compared to the user passing this on after having received the alert only at that user's phone. Any signaling method as known in the art or later developed may be used to send a signal from the cell phone to the other user(s), be the other user(s) other cell phones or landline telephones. Then this signal, once received, would lead to provision of an advisory alert indicating the possibility of a dropped call.

EXAMPLE 1

The following provides one example, not meant to be limiting of an algorithm capable of use in embodiments of the present invention to provide an advisory alert based on a change in signal strength.

Symbols and variables used in the algorithm are as follows:

Let $m_c$ denote any current measured RSSI expressed in a value,

Z be a specified number of signal ranges, as configured or calculated, for the execution cycle, j be an element in the inclusive set of integers from 1 to Z, $j \in \{1,2,3,\ldots Z\}$, $R_j$ correspond to an RSSI signal range for the interval j, $T_j$ correspond to a tolerance, T, that is percentage change, as configured or calculated by the manufacturer to generate an alert, for the interval j, $K_Z$ represent a maximum number of samples to average/smooth per range $R_j$, L denote a signal strength limit value, as configured or calculated by the manufacturer, for an execution cycle, such that $L_{R1}$ is the lowest signal value for the strong signal range $R_1$, and $L_{R(z-1)}$ is the lowest signal value for the second lowest signal range, $L_{R(z)}$ would be a presumptive zero for some level of precision as determined by specification, and finally, let A denote an average of signal values.

Configuration Relations (Illustration only)

| Range Z | Lower Limit $L_R$ | Max Samples $K_z$ | Tolerance % $T_z$ |
|---|---|---|---|
| 1 | $L_1$ | $K_1$ | $T_1$ |
| 2 | $L_2$ | $K_2$ | $T_2$ |
| . | . | . | . |
| . | . | . | . |

-continued

| Range Z | Lower Limit $L_R$ | Max Samples $K_z$ | Tolerance % $T_z$ |
|---|---|---|---|
| . | . | . | . |
| Z-1 | $L_{(z-1)}$ | $K_{(z-1)}$ | $T_{(z-1)}$ |
| Z | $L_z$ | $K_z$ | $T_{z(0.0)}$ |

As to the following algorithm, although a syntax similar to C/C++ programming language has been used to present the algorithm, not all steps have been presented as language statements since the implementations selected by the manufacturer may vary significantly. The averaging/smoothing referenced as a summation below is a representation of similar logic which may be selected for evaluating signal progressions.

In consideration of the above, the algorithm is depicted as follows:

```
[power on sequence]
[initialize current sample count, c]
while (1)   // continuous loop logic during user operation
{
  [setup limits, tolerance, interval count, etc. per specified
   implementation]
  [obtain current signal strength measurement, m_c]
  int i = 1;        // initialize strength interval loop control i
  while (i <= Z)    // check measurement against criteria for interval until
                       found
  {
    if (m_c > L_Ri)   // determine pertinent signal interval
    {
      // calculate average/extrapolate delta for range R_i
      A = ( Σ m_v ) / N
         where v ranges from (c-K_i) to (c-1), c is the number of the
         current sample and includes up to K_i preceding signal strength
         measurements, and N is the number of samples evaluated and
         is an integer from 1 to K_i.
      // check percentage variation to tolerance delta percentage.
      if ((1 − (m_c / A)) > T_i)
      {
        [generate alert signal]
        [wait interval if configured]
      }
      i = Z + 1;     // set interval control to exit evaluation loop
      [save measurement for next iteration]
    } else {
      ++i;        // increment interval loop control
    }
  }
  [retain parameters as necessary]
}
[power off sequence]
[power off]
```

It may be appreciated that for a small number of signal ranges, the above algorithm behaves as a stepped, or discontinuous algorithm, particularly when the tolerance values for adjacent signal ranges are substantially different. However, when the number of signal ranges is relatively large, the algorithm behaves as a continuous function.

While the preferred embodiments of the present invention have been shown and described herein in the present context, such embodiments are provided by way of example only, and not of limitation. Numerous variations, changes and substitutions will occur to those of skilled in the art without departing from the invention herein. For example, the present invention need not be limited to best mode disclosed herein, since other applications can equally benefit from the teachings of the present invention. Accordingly, it is intended that the invention be limited only by the spirit and scope of the appended claims.

What is claimed is:

1. In a cellular telephone having a keypad, a method of alerting a user to possible loss of a call due to low signal strength comprising:
   a. measuring incoming signal strength;
   b. calculating changes in incoming signal strength;
   c. comparing changes in incoming signal strength to a designated percentage;
   d. providing an advisory alert to said user that indicates the possible loss of a call due to low signal strength when, during a designated time interval, the incoming signal strength decreased by the designated percentage; and
   e. selecting the designated percentage related to a first range of initial signal strength, and selecting an additional designated percentage related to a second range of initial signal strength, said initial signal strength comprising a starting value of the designated time interval.

2. The method of claim 1 and including the step of inputting the designated percentage by a user of the cellular telephone.

3. The method of claim 2 wherein the step of selecting the designated percentage comprises pressing by strokes a sequence of keys on the keypad.

4. The method of claim 1 and including the step of selecting a designated time interval.

5. The method of claim 4 wherein the step of selecting the designated time interval comprises pressing by strokes a sequence of keys on the keypad.

6. The method of claim 1 additionally comprising selecting recipients of said advisory alert from the group consisting of the user, a party participating in the call with the user, and both the user and the party.

7. The method of claim 1 and including the step of selecting a type of advisory alert output selected from the group consisting of a sound signal, a vibrational signal, and a light signal.

8. The method of claim 1 wherein the step of providing comprises sending an electronic signal to generate an audible sound at an earpiece speaker of the cellular telephone.

* * * * *